Oct. 27, 1970 MICHIAKI ITO 3,536,922

SPACE DIVERSITY OPTICAL COMMUNCATION SYSTEM

Filed July 20, 1967

INVENTOR.
MICHIAKI ITO

BY

Hopgood & Calimafde

ATTORNEYS

United States Patent Office 3,536,922
Patented Oct. 27, 1970

3,536,922
SPACE DIVERSITY OPTICAL COMMUNICATION SYSTEM
Michiaki Ito, Tokyo-to, Japan, assignor to Nippon Electric Company, Limited
Filed July 20, 1967, Ser. No. 654,874
Claims priority, application Japan, Aug. 31, 1966, 41/57,405, 41/57,406
Int. Cl. H04b 9/00
U.S. Cl. 250—199 2 Claims

ABSTRACT OF THE DISCLOSURE

An optical laser communication system employing space diversity concepts. Light divided by an analyzer into two beams is separately collimated to twin receivers including photomultipliers whose outputs are combined.

BACKGROUND OF THE INVENTION

The conventional broad band optical communication system comprises a laser, means responsive to a signal voltage for modulating the laser beam, and a collimator; arranged such that a modulated beam is directed to the receiving site by means of the collimator. It has been found that the refractive index along a path on the surface of the earth fluctuates unintermittently and irregularly in time and space due to wind, rainfall, sunshine, chimney exhaust, etc. When the atmosphere along the path is homogeneous and steady, a receiving telescope having a receiving aperture of around ten centimeters is generally sufficient to receive the transmitted beam. In practice, however, this is seldom the case and a broadening and quivering of the laser beam due to the above-mentioned atmospheric conditions is the rule rather than the exception. Although this difficulty may be overcome by enlarging the aperture of the optical condenser system in proportion to the expected broadening and quivering of the laser beam, the enlargement of the aperture is limited from an economic point of view, since the weight and cost of a receiving telescope increases in proportion to the third power of the aperture.

OBJECTS OF THE INVENTION

Accordingly, it is an object of the present invention to provide a space diversity optical communication system, wherein the undesired effect due to the broadening and quivering of the laser beam is considerably reduced without resorting to an enlargement of the aperture of the receiving telescope.

It is another object of the present invention to provide an optical communication system, wherein the increase in cost is minimized by making use of existent light that has not conventionally been used for signal transmission.

BRIEF SUMMARY OF THE INVENTION

In the optical communication system of the present invention, a polarization-modulated laser beam, in which the plane of polarization is rotated by means of a modulating element, is directed to an analyzer (e.g., of the double refraction prism type) wherein the beam is divided into two beams each intensity-modulated 180° out of phase from the other. The two beams are respectively directed to two collimators and beams emerging from the collimators arrive at respective receiving telescopes through atmosphere. The beams are mutually separated by a minimum distance such that the fluctuations of the refractive indices occur independently. The received laser beams are then transduced and combined to reproduce the original signal.

In the conventional laser communication system, one of the outputs of the analyzer is not transmitted. Therefore, it does not contribute to the signal transmission. According to the invention, however, since both outputs are used for the signal transmission, a substantial part of the second ttransmitter necessary for the diversity system need not be additionally supplied.

In a modification of the invention, each of the two outputs of the analyzer is divided into two by means of beam dividers, and respectively directed to the two collimators, with the result that a quadruplex diversity communication system is realized. In other words, in the aforementioned quadruplex diversity optical communication system, each of the transmitting collimators transmits two beams to the separately disposed receiving telescopes and each of the receiving telescopes receives two beams transmitted from different collimators so as to form two images. The photoelectric detector-amplifiers are installed at each of the image points, and the signal transmission is performed by four light beams in total, each of which is transmitted through a separate path.

The present invention is predicated on the fact that the fluctuation of the refractive index of air at one point occurs independently of that at another point provided that distance between the two points is longer than the "correlation" length. Assuming that the probability of missing of a laser beam by the receiving telescope is time rate $p$ when only one light path is provided between transmitting and receiving sites, the probability of simultaneous missing all the laser beams from the receiving telescope becomes $p^2$ or $p^4$ when two or four light paths are employed according to the invention. Consequently, it may be understood that the probability of the communication malfunction is reduced from $p$ to $p^2$ or $p^4$.

The above mentioned and other features and objects of this invention and the manner of attaining them will become more apparent and the invention itself will best be understood by reference to the following description of embodiments of the invention taken in conjunction with the accompanying drawings, the description of which follows.

DESCRIPTION OF THE DRAWINGS

In the following description, it will be understood that well known constituent elements not directly concerned with the concept of the invention have been omitted for simplicity. In FIG. 1 a laser beam 12 generated by a laser 11 is incident upon a modulator 13 (e.g., a KDP crystal) in parallel with its optical axis. The polarization of the laser beam is rotated in proportion to the signal voltage supplied from a modulating signal source 31 due to an electric field applied in parallel with optical axis of the modulator 13. An analyzer 14 employing a double refraction prism receives the polarization-modulated laser beam from the modulator 13 and divides it into two intensity-modulated components with orthogonal polarization directions. The outputs of the analyzer 14 are two light beams 15A and 15B, respectively represented by $$I_o \cos^2\left(\frac{\pi}{4}+aV_s \cos W_s t\right)$$

and $$I_o \sin^2\left(\frac{\pi}{4}+aV_s \cos W_s t\right)$$

Figure 1:
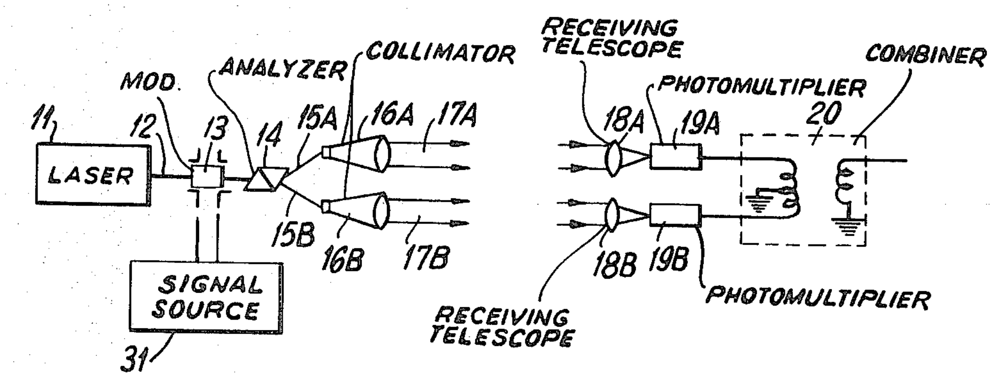
FIG. 1 is a block schematic diagram of a first embodiment of the present invention.

where $I_o$, $V_S$, $W_S$ and $a$ are, respectively, the intensity of the laser beam before being subjected to modulation; the modulating signal voltage; the angular frequency of the modulating signal, and a constant determined by the particular structure of the modulator.

In the conventional optical communication system, one of the modulated laser beams 15A and 15B is not utilized, and the other is transmitted to the receiver as an amplitude-modulated laser beam. In contrast, according to the invention, both the beams are transmitted. Signal beams 15A and 15B are respectively transmitted by means of different collimators 16A and 16B, through the different paths 17A and 17B to the different receiving telescopes 18A and 18B disposed at the receiving site. These received beams are separately converted to signal currents by means of separate photoelectric converter-amplifiers (for example, photomultipliers). Thereafter, the signal currents are synthesized by means of a combiner 20.

When the medium between transmitting and receiving sites in homogeneous the two output currents of the photoelectric converter-amplifiers 19A and 19B are respectively represented by $$K\cos^2\left(\frac{\pi}{4}+aV_s\cos W_st\right)=K\left[1+\cos\left(\frac{\pi}{2}+2aV_s\cos W_st\right)\right]$$

and $$K\sin^2\left(\frac{\pi}{4}+aV_s\cos W_st\right)=K\left[1-\cos\left(\frac{\pi}{2}+2aV_s\cos W_st\right)\right]$$

where K is a constant. Thus, by means of the combiner 20 connected as shown in the drawings the signals are easily synthesized.

The duplex diversity optical communication system of the invention may be modified to a quadruplex diversity optical communication system by adding only a small number of elements. An example of such system will be explained.

Figure 2:
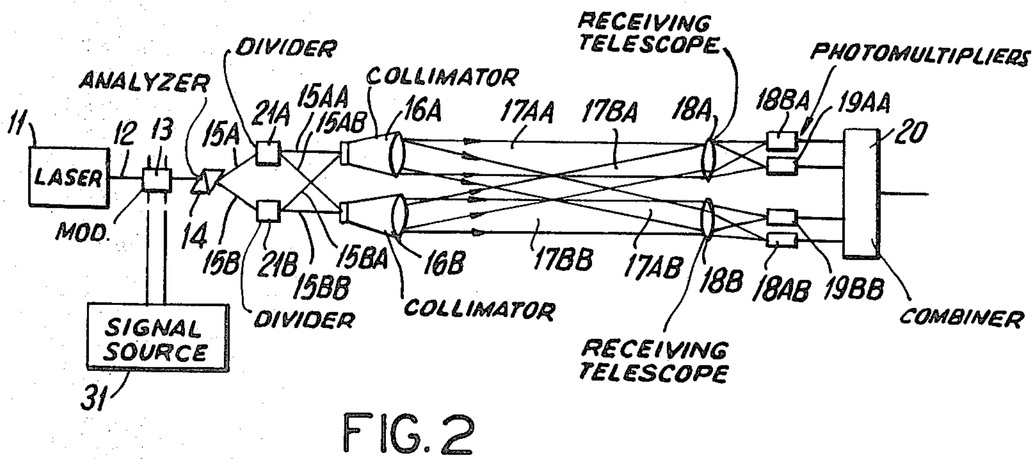
FIG. 2 shows a block schematic diagram of a second embodiment of the present invention.

Referring to FIG. 2, which shows the second embodiment of the invention the plane of polarization of the laser beam 12 supplied from the laser 11 is rotated in the modulator 13 in response to the modulating signal voltage. It is then divided into two laser beams 15A and 15B which are amplitude-modulated in mutually inverse phase by means of the analyzer 14 of the double refraction prism type. Each of these two laser beams is further divided into two by means of the dividers 21A and 21B. Thus, laser beams 15AA, 15AB, 15BA and 15BB are produced. The laser beams 15AA and 15BA are directed to a collimator 16A, while the laser beams 15AB and 15BB to another collimator 16B.

Figure 3:
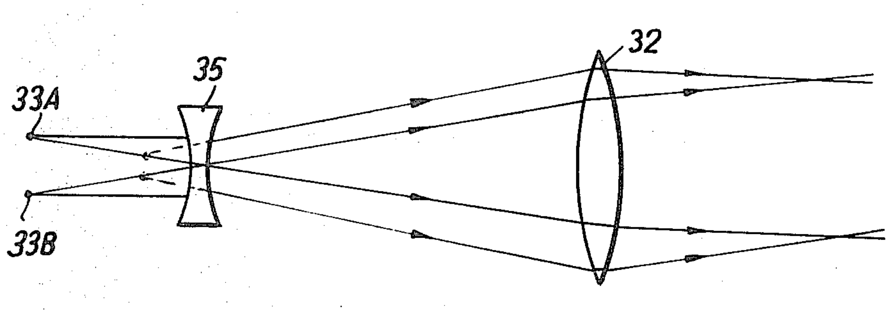
FIG. 3 shows a detail of the collimator of the embodiment of FIG. 2.

Among the various collimators specifically suitable, the simplest, a Galilean telescope, is shown schematically in FIG. 3. This is constructed so that the images of the light sources 33A and 33B are formed in the vicinity of the respective remote receiving telescopes (practically, infinity) by means of the combination of a divergence lens 35 and a convergence lens 32.

Referring again to FIG. 2, as is well known from the property of the telescope, the angle between laser beams 15AA and 15AB incident on the eyepiece side of the telescope is equal to the product of the angle magnification and the angle between the beams 17AA and 17AB emerging from the objective lens. Therefore, each of the laser beams 17AA, 17AB, 17BA and 17BB can be directed to the aimed receiving telescope by directing the optical axes of the transmitting collimators 16A and 16B to the middle of the receiving telescopes 18A and 18B, and also by suitably adjusting the incident angle of the input laser beams directed onto the transmitting collimator. Under practical operating conditions, since the lateral distance between the collimators or receiving telescopes is preferably several meters to several tens of meters, and since the distance between the transmitter and the receiver is of the order of several kilometers, the angle between the laser beams is small, with the result that the problem of aberration is not encountered.

By installing photoelectric converter-amplifiers 19AA, 19AB, 19BA and 19BB at the positions, on which the laser beams 17AA, 17AB, 17BA and 17BB, which are incident upon the receiving telescopes 18A and 18B, from the images of the corresponding light sources, each of the laser beams is converted to an electrical current proportional to its intensity without mutual interaction. The outputs of these photoelectric converter-amplifiers 19AA, 19AB, 19 BA and 19BB are applied to the combiner circuit 20.

The combiner circuit 20 is constructed in any of the well known manners to generate the sum of the outputs of the converter-amplifiers 19AA and 19BA, the sum of the outputs of the converter-amplifiers 19AB and 19BB, the difference of the outputs of the converter-amplifiers 19AA and 19BB, and the difference of the outputs of the converter-amplifiers 19BA and 19AB, the modulating signal voltage similar to that at the transmitting site is reproduced at the output of the combiner 20. The order of the synthesization of the outputs from four converter-amplifiers 19AA to 19BB is arbitrarily chosen.

Now, in considering which of the methods is most advantageous, the time rate *p*, during which the intensity of the laser beams received by the receiving telescope is weaker than the lowest detectable level, shall be assumed smaller than $10^{-8}$. One method is, as mentioned, to make the receiving telescope large, while the other is the employment of the diversity system according to the invention utilizing two or four optical paths. If it is assumed that the fluctuation with time of the light beam straying from the center of the light receiver has the Gaussian distribution, the aperture of the light receiver for satisfying $p<10^{-8}$ must be a few times as large as that for satisfying $p<10^{-4}$. However, since the manufacturing cost increases in proportion to third power of the aperture, it will become quite expensive. On the other hand, by employing the diversity system of the invention, the manufacturing cost is at most twice, because only the two collimators having the apertures identical to the conventional system are sufficient. The additional cost for the auxiliary constituent elements is relatively minor.

In the foregoing embodiment, any laser including He-Ne laser or Ar laser and the like, which oscillates in the infrared and visible regions, can be used. Any electro-optic crystals, such as ADP or KDP crystal, can be used as the modulator 13. A semi-transparent mirror or a double refraction prism inserted with the suitable orientation can be used as the beam dividers 21A and 21B. A telescope utilizing a combination of a concave mirror and a convex lens may be used as the light receivers 18A and 18B.

Although two embodiments of the present invention have been described above, the invention can be realized by various alternative ways.

For example, the combiner 20 may be a subtraction circuit composed of transistors or vacuum tubes instead of the coupling transformer as shown in FIG. 1. In case the subtraction circuit or the transformer coupling is used, the output signal-to-noise ratio degrades to the maximum extent of 6 db in the duplex diversity system, and 3 db in the quadruplex diversity system, if one of the signals being transmitted becomes low, because the noises generated in the photoelectric converter-amplifiers 19A, 19B and 19AA . . . are inevitably added to the sum of the signals. The effect of the low signal-to-noise ratio light path can be eliminated by use of a switch which selects only the largest output from those supplied from the photoelectric converter-amplifiers 19A, 19B and 19AA. . . . Usually, since the frequency of the received level fluctuation due to the fluctuation of the atmospheric refractive index is at most of the order of an audio frequency, the abovementioned combiner of the switching type is easily realizable.

Since a combiner circuit of this kind is easily constructed by techniques widely used in conventional radio communication systems, its detailed description will be omitted. Also, although the laser beams are transmitted from the transmitting collimators 16A and 16B to the receivers through the independent paths in the embodiment shown in FIG. 2, a single receiving telescope is often usable in common for the reception of signals supplied from the two transmitting collimators. This is possible because the effect of the fluctuation of the refractive index on the direction of the light beams is small in the vicinity of the receiving telescope and even if there is only one receiving telescope, the images of the laser beams coming from the collimators can be separately formed (with the result that the signals can be directed to the separate photoelectric converter-amplifiers 19A and 19B) because the directions of the incident light beams 17A and 17B are slightly different. The same applies also to the embodiment shown in FIG. 2. Moreover, the photoelectric converter-amplifiers 19A, 19B, 19AA . . . can be incorporated in a single common integrated circuit formed on a semiconductor substrate instead of constructed by the separate elements.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. A space diversity optical communication system comprising:

a transmitter including a laser;

modulating means optically aligned with the laser output and responsive to a signal voltage to be transmitted for producing a rotated component in the plane of polarization of a light beam supplied from said laser;

an analyzer optically aligned with said modulating means for dividing the modulated light beam into two spatially separated light beams;

at least two collimators for respectively directing said divided modulated light beams to a receiving site;

and a receiver at said site having at least one light receiver for receiving the light beams transmitted from said collimators;

at least two photoelectric converter-amplifier means disposed in the vicinity of the focal point of said light receiver; and a signal combiner coupled to said photoelectric means for synthesizing the output signals of said photoelectric converter-amplifier means to produce a synthesized signal.

2. The optical communication system claimed in claim 1 further comprising:

at least two light beam divider means for dividing each said divided modulated light beams into two light beams, the two transmitting collimators respectively directing said divided modulated light beams supplied from said divider means to the receiving site;

and said receiver having at least one additional light receiver, each said light receiver for respectively receiving the light beams transmitted from said transmitting collimators, wherein each of said transmitting collimators radiates light beams from both said light beam divider means and each of said light receivers receives a plurality of the light beams transmitted from said transmitting collimators and supplies them to said photoelectric converter-amplifier means.

References Cited

UNITED STATES PATENTS

| | | | |
|---|---|---|---|
| 2,531,951 | 11/1950 | Shamos et al. | 250—199 XR |
| 3,215,840 | 11/1965 | Buhrer | 250—199 |
| 3,277,393 | 10/1966 | Nicolai. | |
| 3,383,460 | 5/1968 | Pritchard. | |
| 3,408,498 | 10/1968 | Ohm | 250—199 |
| 3,415,995 | 12/1968 | Kerr | 250—199 |

RICHARD MURRAY, Primary Examiner

R. S. BELL, Assistant Examiner

U.S. Cl. X.R.

332—7.51; 350—169